United States Patent Office 3,324,074
Patented June 6, 1967

3,324,074
METHACRYLATE POLYMERS WITH FILLERS
AND COUPLING AGENTS
Robert J. McManimie, Glendale, Mo., assignor to Monsanto Company, St. Louis, Mo., a corporation of Delaware
No Drawing. Filed Jan. 6, 1965, Ser. No. 423,862
16 Claims. (Cl. 260—41)

This invention relates to reinforced polymeric compositions and to processes of preparing them. In certain aspects this invention relates to rigid polymeric compositions comprising an alkyl methacrylate polymer and a reinforcing medium, chemically bound to the polymer by a coupling agent.

The terms "reinforcing agent" and "reinforcing medium" apply to inorganic substances, subsequently described in detail which are chemically bonded to a polymer through a coupler. This is in distinction to inorganics which serve as fillers or diluents for a polymer system and are not chemically bound to the polymer matrix. Since the reinforcement produced by the practice of this invention is achieved by chemical bonding, described subsequently herein, the terms "reinforced polymeric composition" and "reinforced polymer" refer to those compositions comprising a polymer and reinforcing agent wherein the reinforcing agent is chemically bound to the polymer through a third component referred to as a coupling agent. A coupling agent is a compound containing two or more reactive groups, at least one of which is suitable for reaction with the polymer or monomer, and at least one of which is suitable for reaction with a reinforcing agent. The term "granular" as used subsequently in this disclosure refers to particles wherein the smallest and largest dimensions of a single particle differ by no more than a factor of about five. The term "acicular" refers to particles having a length over diameter ratio (l./d.) of from five to fifteen.

It is well known that polymeric compositions can be filled with non-polymeric substances, i.e. materials which do not enter into the polymerization process can be mixed with the monomer feed or polymer product so as to form a uniform finished product. Initially, various fillers were used in a polymeric material to color the polymer, change the coefficient of expansion, improve abrasion resistance, modulus, and strength, and to dilute the polymer thereby lowering its costs. It was, and is now, common practice to admix a filler and polymer in several ways so as to effect a mechanical bond between the two components. One method has been to mix thoroughly a liquid prepolymer and filler and subsequently complete polymerization of the prepolymer, thereby producing a composition wherein the filler is intimately dispersed throughout the finished product. Another method has been to subject uncured polymer and filler to a shearing force whereby the filler is forced into some type of mechanical bond with the polymer upon curing. Various other methods of achieving mechanical bonding of filler to polymer are also well known in the art.

The upper limit of filler that can be used in mechanical mixtures with polymers without adversely affecting the physical properties of the product is low. The tensile and flexural strengths particularly fall off sharply at relatively low concentrations of filler. An exception to this generalization has been the use of fibrous material, particularly fibrous glass particles, in polymeric compositions. The incorporation of fibrous glass into a polymer increases physical properties significantly, but, generally, such improvement has not been achieved by the use of short fibered or granular material. The reason for this decrease in strength exhibited by granularly filled polymers is that a particulate filler in a polymer is not a component comparable to a fiber in load distribution characteristics. Normally a filler acts to concentrate stresses rather than distribute them. As a result, the polymer-filler interface is the weak link in the composite structure. With a fibrous filler, the plurality of weak links along the fiber surface result in a reasonably strong bond when stress is applied in a direction parallel to the orientation of the fibers. When a transverse stress is applied to longitudinally oriented fibrous filler or when any stress is applied to particulate filled materials, the stress is not well distributed and the composition is weak. Therefore a filled polymeric product which contains less polymer per unit volume of the product than an unfilled polymer, ordinarily possesses physical properties inferior to the unfilled polymer, particularly at granular filler concentrations of about 50% or more.

Several polymer-granular filler systems have been developed for various reasons such as cost reduction, or ultra violet resistance. It has now been discovered that by proper combination of an alkyl methacrylate polymer and granular inorganic material, the inorganic material no longer acts as a mere filler but actually functions as a reinforcing agent. In this invention, the physical properties of the polymer do not decrease with increasing proportions of granular filler, but rather are improved significantly at high proportions of reinforcing agent.

The reinforcement of alkyl methacrylate polymeric compositions by means of granular particles, as distinguished from fibrous particles, is a desirable feature since a granular inorganic-monomer or prepolymer mixture is more fluid, hence more easily cast or molded, than a mixture containing an equivalent amount of a fibrous material.

It is an object of this invention to provide reinforced polymeric compositions of outstanding properties, heretofore unattained by the prior art. It is a further object of this invention to provide an alkyl methacrylate polymer reinforced with a reinforcing medium wherein the reinforcing medium is chemically bound to the polymer by means of a coupling agent. It is a further object of this invention to provide a method for producing a reinforced alkyl methacrylate polymer wherein the reinforcing medium is chemically bound to the polymer by means of a coupling agent. It is a further object of this invention to provide a method for treating inorganic particles so that they may be subsequently chemically bound to an alkyl methacrylate polymer. It is another object of this invention to provide reinforced molded objects of an alkyl methacrylate polymer. It is still another object to provide a process for the preparation of reinforced polyalkyl methacrylate compositions. It is yet another object to provide monomer-inorganic slurries for casting which have low settling rates of the inorganic particulate material. Additional objects, benefits and advantages will become apparent to one reading the following detailed description of the invention.

The polymeric compositions of this invention comprise an alkyl methacrylate polymer reinforced with an inorganic material which is chemically bound to the polymer through a trialkoxysilylalkyl acrylate coupling agent of the formula

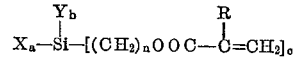

where R is hydrogen or alkyl, X is a hydrolyzable group such as halogen, alkyl carboxylate, alkoxycarbonyl, or a lower hydrocarbyloxy, radical, e.g. an alkoxy radical having from 1 to 6 carbon atoms, Y is a hydrocarbyl radical such as an alkyl radical, $n$ is an integer from 1 to 6, $a$ is an integer from 1 to 3, $b$ is an integer from 0 to 2, c is an integer from 1 to 3 and the sum of $a+b+c$ equals 4.

The alkyl methacrylate polymers useful in the compositions of this invention include alkyl methacrylate homopolymers, copolymers and mixtures of homopolymers and copolymers. Suitable monomers include methyl methacrylate, ethyl methacrylate, n-propyl methacrylate, isopropyl methacrylate, 2-ethyl hexyl acrylate and the isomeric butyl methacrylates. Preferred copolymers are prepared by the copolymerization of methyl methacrylate with one or more alkyl acrylates or alkyl methacrylates, e.g., ethyl acrylate, propyl acrylate, 2-ethyl hexyl acrylate, butyl methacrylate, lauryl methacrylate. Polymeric network structures, in distinction to the generally linear structures, are obtained by the use of alkyl methacrylate copolymer with polyfunctional methacrylates such as ethylene glycol dimethacrylate, propylene glycol dimethacrylate, butylene glycol dimethacrylate, polyethylene glycol dimethacrylate and trimethylolpropane trimethacrylate. Thus, the term "alkyl methacrylate polymer" as used herein, is intended to include alkyl methacrylate homopolymers and alkyl methacrylate copolymers of alkyl methacrylates with other alkyl methacrylates and/or alkyl acrylates. Alkyl methacrylate polymers also encompass the copolymers of an alkyl methacrylate with other monomers copolymerizable therewith, for example styrene, α-methyl styrene and other substituted styrenes such as the ring-substituted methyl styrenes, biallyl, acrylonitrile, maleic anhydride, 2-hydroxy alkyl methacrylates and methacrylonitrile.

The alkyl methacrylate polymers useful in the preparation of these novel compositions can be linear or crosslinked. Crosslinking provides some improvement in physical properties, particularly heat distortion temperature, but the linear polymers are also definitely included within the scope of this invention. The maximum amount of tolerable crosslinking in the polymer depends upon the proposed use of the finished composition. Increased crosslinking produces compositions with higher heat distortion temperature, but somewhat lower impact strength, and flexural strength. Consequently, control of crosslinking provides a variable which enables one to tailor the polymer to produce a composition of the desired properties. A suitable amount of crosslinking is that which will provide a polymer with an effective molecular weight around 20,000 or more, preferably 30,000 or more. Therefore a linear alkyl methacrylate polymer with a molecular weight around 20,000 or more may not need to be crosslinked whereas a lower molecular weight polymer, e.g. a polymer with a molecular weight of 5,000 or less, would be better utilized in the practice of this invention if it were crosslinked. Suitable crosslinking agents are well known in the art and can be used here in the conventional manner. Crosslinking can be achieved through the coupler, by hydrolysis of silanol groups, to form siloxane linkages, i.e.

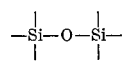

and by the use of polyfunctional monomers as described above.

The reinforcing agents of the present invention are inorganic materials which are substantially insoluble in water, i.e. less soluble than 0.15 gram per liter. Such materials can be selected from a variety of minerals, primarily metals, metal oxides, metal salts such as metal aluminates and metal silicates, other siliceous materials, and mixtures thereof. Generally, those materials which have or can acquire an alkaline surface upon treatment with a base are best suited for the reinforced polymeric compositions. Since metal silicates and siliceous materials usually have or can readily acquire the desired alkaline surface, a preferred mixture for use in this invention is one which contains a major amount, i.e. more than 50% by weight, of metal silicates or siliceous materials. Materials with such characteristics are preferred because of the ease with which they can be coupled to the polymer. However, other substances such as alumina which are coupled to an alkyl methacrylate polymer by the use of higher levels of coupling agents, can be used as reinforcing components either singly or preferably combined with other minerals which are more susceptible to coupling, and more preferably combined in minor amounts, i.e. percentages of less than 50% of the total reinforcing material. An example of such a material useful as a reinforcing agent, with which alumina can be mixed, is feldspar, an igneous crystalline mineral containing about 67% $SiO_2$, about 20% $Al_2O_3$, and about 13% alkali metal and alkaline earth metal oxides. Feldspar is one of the preferred reinforcing agents of this invention and a feldspar-alumina mixture is also useful. Other materials particularly preferred as reinforcing agents are those materials with an alkaline surface such as wollastonite, which is a calcium metasilicate; asbestos, such as chrysolite, a hydrated magnesium silicate; crocidolite; and other calcium magnesium silicates. Other useful reinforcing agents include: quartz and other forms of silica, such as silica gel, ground glass, glass fibers, cristobalite, etc.; metals such as aluminum, tin, lead, magnesium, calcium, strontium, barium, titanium, zirconium, vanadium, chromium, manganese, iron, cobalt, nickel, copper, and zinc; metal oxides such as oxides of aluminum, tin, lead, magnesium, calcium, strontium, barium, titanium, zirconium, vanadium, chromium, manganese, iron, cobalt, nickel, copper, and zinc; heavy metal phosphates, sulfides and sulfates in gel form; and minerals and mineral salts such as spodumene, mullite, mica, montmorillonite, kaolinite, bentonite, hectorite, beidellite, attapulgite, graphite, chrysolite, garnet, saponite and hercynite.

The term "inorganic material" or simply "inorganic" used in this disclosure refers to materials such as exemplified above. Particularly preferred are those inorganic siliceous materials which have or can acquire an alkaline surface upon treatment with a base and which have a 3-dimensional crystal structure as opposed to a 2-dimensional or planar crystal configuration. These siliceous materials are also characterized by a somewhat refractory nature with a melting point above about 800° C., a Moh's hardness of at least 4, and a water solubility of less than 0.1 gram per liter. Examples of preferred siliceous materials include minerals such as feldspar, quartz, wollastonite, mullite, kyanite, chrystolite, cristobalite, crocidolite, fibrous aluminum silicate having the formula $AlSiO_5$, spodumene and garnet. These minerals are especially desirable for use in reinforced polyalkyl methacrylate compositions for a number of reasons. For instance, they provide a composition with better abrasion resistance, flexural strength and modulus, tensile strength and modulus, impact resistance, resistance to heat distortion and resistance to thermal expansion than do conventional clay fillers and inorganic pigments such as whiting. Further, they provide higher loading levels than can be achieved with glass fibers, an important economic consideration. In addition, these highly loaded monomer slurries can be directly cast into a final polymerized form, thereby eliminating several processing steps necessary with glass fiber-reinforced compositions.

The amount of reinforcing agent to be used in the preparation of the polymeric composition can vary over a wide range with the maximum content being limited primarily by the ability of the polymer to bind the reinforcing medium into a cohesive mass. Techniques subsequently described herein have enabled me to prepare polymeric compositions containing as much as 85 or 90% by weight reinforcing agent.

The lower range of reinforcing agent concentration is limited only insofar as it is necessary to have sufficient inorganic present to effect an improvement in physical properties of the polymeric composition. Consequently, inorganic concentrations as low as 25% by weight or less can be used, particularly if the finished composition has been extruded into filament form. A preferable lower limit for the reinforcing agent, especially in the case of molded composition, is 30% by weight of the total composition, and more preferably 40% by weight. Suitable values for reinforcing agent concentration in the finished composition range from about 25 to 90%, preferably from about 40 to 90% and more preferably from about 50 to 90% by weight. Objects which are not to be subsequently reworked can be prepared with higher levels of reinforcing agent.

Particle shape and size of the reinforcing agent affect physical properties of the finished composition. In a preferred aspect of this invention, the reinforcing agent is admixed with a monomer or preplymer and subsequently cast into a mold where the polymer is formed and cured. In such a method, the viscosity of the monomer or prepolymer-inorganic slurry becomes a limitation on the maximum amount of reinforcing agent which can be used, i.e. too high an inorganic concentration produces mixtures too viscous to cast into molds. This limitation on inorganic concentration imposed by viscosity is partly dependent upon the shape of the particulate inorganic. For example, spherical particles do not increase the viscosity of the monomer mixture as much as fibrous materials. By adjusting the particle shape of a reinforcer and thereby controlling the viscosity of the monomer mixture, it is possible to prepare improved castable or moldable polymeric compositions containing a very large amount of reinforcing agent.

Another factor which has an effect on the upper limit of inorganic concentration is the particle size distribution of the inorganic. A wide distribution of particle sizes provides a composition with a small amount of voids or spaces between the particles, thereby requiring less polymer to fill these spaces and bind the particles together. Proper combination of the two variables of particle shape and size distribution enables one to prepare highly reinforced compositions containing a major proportion of reinforcing agent.

Particle size distribution is a variable which has an effect on the degree of inorganic loading possible. Generally particles which pass through a 60 mesh screen are small enough to be used in the compositions of this invention. Particles as large as 1,000μ (18 mesh) can be used with equal or nearly equal success, and particles as small as 0.5μ have been successfully employed and particles in the range of 200 to 400 millimicrons can also be used. More descriptive of suitable particles than limits on particle size is a specification of particle size distribution. A suitable wide particle size distribution is as follows:

| | Percent |
|---|---|
| 250μ or less (60 mesh) | 100 |
| 149μ or less (100 mesh) | 90 |
| 44μ or less (325 mesh) | 50 |
| 5μ or less | 10 |

A narrower distribution also suitable for use in this invention is:

| | Percent |
|---|---|
| 62μ or less (230 mesh) | 100 |
| 44μ or less (325 mesh) | 50 |
| 11μ or less | 50 |
| 8μ or less | 10 |

A relatively coarse mixture useful in this invention has the following particle size distribution:

| | Percent |
|---|---|
| 250μ or less (60 mesh) | 100 |
| 149μ or less (100 mesh) | 90 |
| 105μ or less (140 mesh) | 50 |
| 44μ or less (325 mesh) | 10 |

A suitably finely divided mixture has the following particle size distribution:

| | Percent |
|---|---|
| 44μ or less (325 mesh) | 100 |
| 10μ or less | 90 |
| 2μ or less | 50 |
| 0.5μ or less | 10 |

These figures regarding particle size distribution should not be construed as limiting since both wider and narrower ranges of distribution will also be useful as well as both coarser and finer compositions. Rather these figures are intended as representative illustrations of inorganic compositions suitable for use in preparing the reinforced polymeric compositions. As an example of the variety of particle sizes which can be used in the subject reinforced polymeric compositions, large aggregate an inch or more in diameter can also be incorporated into the polymer matrix for special effects. Examples include ground glass, roofing granules, quartz chips, etc.

The reinforcing agents perform a dual function in the finished compositions. Depending upon the material selected they may serve as an inexpensive addend to the polymer, thereby lowering the cost of the final product. Secondly, and more importantly, these inorganics, when bound to the polymer through a coupling agent, produce compositions with physical properties far superior to those of unreinforced polymers, thereby permitting their use in applications heretofore unsuited for the unreinforced polymers.

To achieve the benefits of this invention, namely the production of easily castable or moldable highly reinforced polymeric compositions plus lower costs from higher loadings of reinforcing agents, it is necessary that the reinforcing agent be substantially granular in shape rather than fibrous. However, a small amount of fibrous material may be incorporated into a polymer system if the amount of granular or acicular material is reduced by some proportionately larger amount. Alternatively, if pourability is not required, larger amounts of fibrous material can be included in the composition, thereby reinforcing the final product to an even greater extent.

The most common fibrous reinforcing agent used is fibrous glass particles. These fibers are most easily incorporated into the polymeric composition when chopped into strands approximately 0.1 to 3 inches in length, and then either added to a prepolymer-coupler mixture as discrete particles or formed into a mat upon which the prepolymer is poured prior to polymerization. These methods of incorporation of glass fibers are known in the art and are mentioned here to demonstrate that the granularly reinforced polymers of this invention can be additionally reinforced by incorporation of fibrous materials according to techniques known in the art or according to the procedure described herein as applicable to granular reinforcing agents.

After optimum particle size distribution of the reinforcing agent is selected for a particular polymer system, it can be appreciated that an upper limit of reinforcing agent can be reached at which point the composition becomes too viscous to be poured into a mold. The viscosity of monomer-inorganic slurries can be reduced by surfactants. Lowered viscosity permits the formation of a finer, smoother finish on the final product. Occasionally a finished composition with a high content of reinforcing agent e.g. greater than 70%, may have a granular or coarse texture and may even contain voids or open spaces due to the inability of the viscous mixture to flow together completely prior to polymerization. The addition of a surface-active agent eliminates this problem and produces a smooth, attractive finish on highly reinforced compositions. If a smooth finish is not a necessary feature for certain applications, then a decrease in viscosity permits incorporation of larger amounts of reinforcing agents into the monomer feed. Anionic, cationic, or nonionic surface active agents can be used to reduce the slurry viscosity and materials such as zinc stearate, long alkyl chain trimethylammonium halides, and alkylene oxide condensates of long carbon chain compounds have been used successfully.

An essential material in the preparation of this reinforced polymeric compositions is the coupling agent which binds the inorganic to the polymer. A coupling agent can be characterized by its functional groups wherein one group is capable of reaction with the monomer during polymerization and at least one group is capable of reaction with the reinforcing agent. Preferred for use with alkyl methacrylate polymers because of their clearly superior coupling capabilities are compounds of the formula

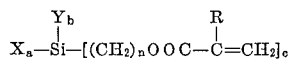

where R is hydrogen or alkyl, X is a hydrolyzable group such as halogen, alkyl carboxylate, alkoxy carbonyl or a lower hydrocarbyloxy radical, e.g. an alkoxy radical having from 1 to about 6 carbon atoms, Y is a hydrocarbyl radical such as an alkyl radical, $n$ is an integer from 1 to 6, $a$ is an integer from 1 to 3, $b$ is an integer from 0 to 2, $c$ is an integer from 1 to 3 and the sum of $a+b+c$ equals 4. Particularly preferred are coupling agents of the above formula where $a$ is 3, $b$ is 0, $c$ is 1, $n$ is at least 2, and X is a methoxy or ethoxy radical.

The inorganic and coupler are joined by contacting them in the presence of, or in the absence of, water, alcohol, dioxane, etc. Presumably, the hydrolyzable X group of the coupler reacts with the hydrogen atoms of appended hydroxyl groups attached to the surface of inorganic materials having an alkaline surface. Theoretically, these hydroxyl groups are present on the surface of, or can be deposited upon the surface of, most metallic and siliceous substances, thereby providing a site available for reaction with a hydrolyzable silane group. This theory of availability of hydroxyl groups on an inorganic surface may explain why many silicon-containing minerals are preferred reinforcing agents since the reaction of the hydrolyzable silane groups of the coupler with the silanol groups, i.e.

of the reinforcing agent produce the very stable siloxane linkage,

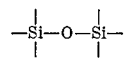

Regardless of any theoretical explanation advanced herein, to which I do not intend to be bound, the silane group is attached to the inorganic by contacting the two components. This composition is preferably but not necessarily dried. A chemical bond between the inorganic and coupler is thus probably obtained. This reaction of inorganic and coupler may be carried out separately, and the dried inorganic coupler adduct subsequently added to the monomer, or the reaction may be carried out in the presence of the monomer and the whole mixture dried to remove volatile reaction products. Preferably, heat is applied to a coupler-inorganic mixture to increase the extent of bonding.

As indicated, the alkylene bridge is present in a coupling agent because of the additional stability it contributes to the coupling agent. The X group can be any hydrolyzable group such as halogen, alkyl carboxylate, alkoxycarbonyl, or alkoxy radical. The Y group can be any hydrocarbyl group; the function of the Y group can be to modify the extent of the polymer-inorganic bond, to regulate viscosity of the monomer slurry, or it need not serve any function at all in the polymeric composition. Its presence may be due to a necessity or desirability to use a hydrocarbyl-substituted silane reactant in the synthesis of a silane coupler.

A reactive functional group on the coupling agent is required to bind the polymer and inorganic together by means of the coupling agent. An ethylenically unsaturated material can participate in the alkyl methacrylate polymerization to achieve the chemical bonding. Particularly preferred because of increased coupling capability are coupling agents containig a methacryloxy group attached to the silicon atom through an alkylene group wherein the alkylene group, if present, has from 1 to 6 carbon atoms. Suitable coupling agents include 2-trialkoxysilylethyl methacrylate, 3-tri-alkoxysilylpropyl methacrylate, and 4-trichlorosilylbutylacrylate where each alkoxy group has from 1 to about 6 carbon atoms.

The amount of coupler with which the reinforcing agent is treated is relatively small. As little as one gram of coupling agent per 1000 grams of reinforcing agent produced a polymeric composition with physical properties superior to those of a polymeric composition containing an untreated filler. Generally, quantities of coupler in the range of 2.0 to 20.0 grams per 1000 grams of reinforcing agent have been found most satisfactory although quantities in excess of that range may also be used.

Catalyst systems preferred for the preparation of the reinforced polymeric compositions are obtained by the rapid catalytic decomposition of peroxygen compounds. Any material that activates a free radical-liberating material within a comparatively short time can be used. For example, a boron trihydrocarbyl, $BR_3$, can be used to activate a peroxygen compound to produce useful polymeric compositions. The activity of the $BR_3$ component is modified by the complexing effect of an amino compound as well as by the appropriate selection of the R radicals in $BR_3$.

As catalysts for inducing the polymerization reaction there may be used any compounds which will generate free radicals under the reaction conditions, although the peroxy compounds are preferred. Specific classes of compounds which can be used include peroxides, such as diacetyl peroxide, acetyl benzoyl peroxide, dipropionyl peroxide, dilauryoyl peroxide, benzoyl peroxide, dimethyl peroxide, diethyl peroxide, dipropyl peroxide, tetralin peroxide, cyclohexane peroxide, acetone peroxide; hydroperoxides such as cyclohexyl hydroperoxide, cumene hydroperoxide, t-butyl hydroperoxide, methyl cyclohexyl hydroperoxide, hydrazine derivatives, such as, hydrazine hydrochloride, hydrazine sulfate, dibenzoyl-hydrazine, diacetylhydrazine, trimethylhydrazinium iodide; amine oxides, such as, pyridine oxide, trimethylamine oxide, dimethylaniline oxide; alkali metal and ammonium persulfates, perborates, and percarbonates; compounds containing the group $>C=N-$ and derived from ketaldones, i.e. a ketone or aldehyde, such as the azines (containing the group $>C=N-N=C<$) e.g., benzalazine, heptaldazine and diphenylketazine; oximes (containing the group $>C=NOH$) such as d-camphor oxime, acetone oxime, alphabenzil dioxime, butyraldoxime, alpha-benzoin oxime, dimethyl-glyoxime; hydrazones (containing the group $>C=N-N<$) such as benzaldehyde phenylhydrazone, phenylhydrazones of cyclohexanone, cyclopentanone, acetophenone, methone, camphor, and benzophenone; semicarbazones (containing the group $$>C=N-NHCONH_2)$$

such as semicarbazones of acetone, methyl ethyl ketone, diethyl ketone biacetyl, cyclopentanone, cyclohexanone, acetophenone, propiophenone, camphor and benzophenone; Schiff's bases (containing the group $>C=N-$) such as benzalaniline, benzal-p-toluidine, benzal-o-toluidine, benzaldehyde derivatives of methylamine, ethylamine, and heptylamine, anils and analogous compounds of other amines, such as acetaldehyde anil, isobutyraldehyde anil, heptaldehyde anil, etc.; oxygen; and the reaction products of organo-metallics such as cadmium alkyls, zinc alkyls, tetraethyl lead, aluminum alkyls, etc. with oxygen.

These catalysts are generally used in amounts from about 0.001% to 0.5% by weight based on the total reactants. While it is generally not necessary, for attaining extremely high rates of reaction or for other special purposes, even higher amounts of catalysts may be used; for example, amounts ranging up to as high as 1% or even 5% as an upper limit can be employed.

Compounds that can be used as activators include the boron hydrides (boranes) and substituted boranes such as borane, diborane, triborane, tetraborane, trimethylborane, triethylborane, tripropylborane, trihexylborane, trioctylborane, tridecylborane, tri-tridecylborane, tricyclohexylborane, triphenylborane, tribenzylborane, triphenethylborane, tri-monomethylbenzylborane, and tritolylborane. I prefer to employ a trialkylborane of the formula $BR_3$, wherein R is an alkyl group of 1 to about 14 carbon atoms.

The boron compounds can be complexed with a basic complexing agent having an ionization constant from about $10^{-5}$ to about $10^{-11}$, preferably from $10^{-7}$ to $10^{-10}$. Particularly preferred are amino compounds having an ionization constant between $10^{-7}$ and $10^{-10}$, one notable example being pyridine. Other suitable amines which can be used include methylamine, di-methylamine, tri-methylamine, dimethylbutyl amine, n-octylamine, the picolines, aniline, dimethylaniline, the toluidines, triethylenediamine and mixtures of several different amines. The mole ratio of amine to boron compound is within the range of 0.1:2 to about 10:1, and is preferably within the range of 0.5:1 to 2:1.

The catalyst system, a trialkylborane-complexing agent with peroxygen compound, permits a rapid polymerization reaction to high conversion without the risks of a runaway-type reaction. Although I prefer to employ an amine as a complexing agent for the trialkylborane, other compounds can also be used for this purpose such as tetrahydrofuran and triphenylphosphine. For certain applications, oxygen or air can be substituted for the peroxygen compound.

Other catalyst systems can also be used in the preparation of the reinforced compositions, although their use generally requires a higher polymerization temperature and/or longer times. These systems include dimethylaniline/benzoyl peroxide, N,N-dimethyl-p-toluidine/benzoyl peroxide, and cobalt naphthenate/dimethylaniline/methyl ethyl ketone peroxide.

The reinforced polymeric compositions of this invention can be prepared by a rapid casting technique. By this procedure a fluid mixture containing monomer, reinforcing agent, coupling agent, and catalyst is charged to a mold, and a shaped solid product removed from the mold within a short time. The system is adaptable to a rapid, controlled polymerization to produce complex shapes at moderate temperatures and pressures. Other processing techniques applicable to the reinforced compositions of this invention include compression molding, transfer molding, injection molding, and rotational and centrifugal casting.

In its broadest aspects, the present inventive process comprises reacting a silane coupling agent previously described in detail with an inorganic material to form an inorganic-coupler adduct, and then conducting a polymerization of an alkyl methacrylate in the presence of said adduct to prepare a methacrylate polymer chemically bonded to the inorganic through the coupler. The coupler can be prereacted with the inorganic prior to addition of the methacrylate monomer (as amply described in most of the subsequent examples) or it can be reacted with the inorganic using the alkyl methacrylate as a dispersing solvent. Substantial coupler-inorganic reaction is aided by application of heat in the range of 90 to 100° C. When the alkyl methacrylate monomer is used as a dispersing solvent, a satisfactory technique for achieving good coupler-inorganic reaction comprises adding the coupler to the monomer, adding the inorganic to the mixture, stirring thoroughly and heating to 100° C., cooling the resultant slurry to 25° C., adding initiator and accelerator, and casting into a mold.

The unusual properties of the reinforced polymer compositions will suggest many uses for these materials to those skilled in the art. Since a hard, smooth surface can be obtained with a simple casting technique, table and counter tops can be prepared as well as billiard and pool table tops, and floor and wall coverings. The polymerization slurries can be used to prepare rotational castings to obtain intricate shapes, and for centrifugal castings of pipe and pipe linings. The slurries can also be modified to form thixotropic mixtures for lay-up moldings. Once cast, molding or sintering powders can be prepared.

In order to illustrate some of the various aspects and advantages of the invention, representative examples are given herein. It will, of course, be understood that variations can be made in the reactions and conditions of the examples without departing from the invention.

*Example 1*

A 3-neck 2-liter reactor, fitted with a motor driven stirrer and a water condenser, was charged with 355.0 g. monomeric methyl methacrylate and 6.7 g. benzoyl peroxide. After these reactants were thoroughly mixed an addition of 546.6 g. ground wollastonite was made. This composition corresponds to 62% by weight of the inert mineral and results in the total charge containing a volume fraction of the mineral of 0.34.

After the reactants were thoroughly mixed this slurry was transferred to a plain mold formed by spacing polished steel plates with rubber tubing to give a mold of ¼" thickness. The mold was pre-heated to 65° C. and the mold space was filled with the aid of a vibrator table. The product was removed from the mold after polymerization was complete, 20 hours at 65° C., and samples were cut from the molded shape for evaluation.

*Example 2*

The charge and procedure used in this run was identical to that of Example 1 with the exception that the wollastonite had been pretreated with a coupling agent. The pretreatment of the mineral was carried out in a tray open to the atmosphere. This tray was charged with 2000 g. of wollastonite and 1200 ml. of methanol containing 5 g, of 3-trimethoxysilylpropyl methacrylate. The resulting slurry was thoroughly stirred manually and then permitted to stand in a hood as the methanol evaporated. The dried product was heated to 210° C. in an oven for 75 minutes and finally milled in a laboratory size ball mill. The molded product prepared in this example was similar in physical appearance to the product obtained in Example 1, but its properties were surprisingly different, as shown in Example 5.

*Example 3*

A viscous slurry was prepared by mixing 335.0 g. methyl methacrylate, 6.7 g. benzoyl peroxide and 781.6 g. untreated ground wollastonite. This slurry was charged to a plain plate mold with extreme difficulty even though the plates of the mold were spaced ¼" part by a rubber gasket. The composition was maintained at 65° C. in the mold for 20 hours and then cooled. The finished product was characterized by bubbles appearing throughout the composition so that it was difficult to secure a sample for evaluation that was free of the bubbles. Evaluation data for this product, containing 70 weight percent mineral, 0.42 volume fraction mineral, is included in Example 5.

*Example 4*

A reinforced polymeric composition was prepared following the general procedure of Example 3 with the exception that the wollastonite, 781.6 g. had previously been treated by 3-trimethoxysilylpropyl methacrylate according to the procedure described in Example 2. This slurry was viscous and a plate mold was charged with difficulty using vibration equipment. Polymerization was continued for 20 hours at 65° C. and the mold opened to obtain a product which was cut into evaluation size samples.

*Example 5*

Evaluation data are reported herein for the products prepared in Examples 1–4.

TABLE I

| Product Example | 1 | 2 | 3 | 4 |
|---|---|---|---|---|
| Volume Fraction Wollastonite | 0.34 | 0.34 | 0.42 | 0.42 |
| Flexural Strength (p.s.i.) | 11,400 | 15,600 | 9,100 | 16,300 |
| Impact Strength (ft. lb./in. notch) | .06/.27 | .14/.36 | .06/.27 | .10/.32 |

Flexural strength was determined according to ASTM D-790 and impact strength was determined according to ASTM D-256. The impact strength values are reported by methods C/A which represent the corrected and uncorrected values as reported in the standardized tests.

It can be seen that high values for flexural strengths and for impact strengths are obtained by the use of a coupling agent which provides a chemical bond between the polymer and the particulate mineral.

*Example 6*

A glass reactor was charged with 175.0 g. methyl methacrylate and 408.2 g. of Supersil silica sand of 325 mesh. The charge of silica sand gave a calculated volume fraction of 0.43, which is equivalent to 68% by weight of the total composition. To the well stirred slurry was added 4.38 ml. cumene hydroperoxide followed by 11.5 ml. of a solution of triethylborane/pyridine complex in a nonylphenol-ethylene oxide condensation product. This catalyst component was prepared by adding 115.4 ml. pyridine to a solution of 140.6 g. triethylborane and 341.8 ml. of the nonylphenol-ethylene oxide condensate (Tergitol NP-27). The reactants were thoroughly mixed for 30 seconds and then poured into a plate mold wherein the plates were spaced 1/8" apart by a rubber gasket. The mold was preheated to 40° C. and the polymerization exotherm, reaching 51° C., was observed after the reactants had been in the mold for about 30 minutes. The mold was immediately opened after the exotherm was measured and a smooth glossy solid composition obtained. Samples were cut from this plate for physical testing (Table II).

*Example 7*

The procedure and charge used in this run were identical to those of Example 6 with the exception that in the instant example the Supersil silica sand was treated with a coupling agent prior to mixing with the other reactants. The silica sand, 500 g. was treated with 250 ml. methanol containing 1.25 g. 3-methacryloxypropyl tri-methoxysilane. The methanol was then evaporated from the well stirred slurry at atmospheric pressure and the treated silica sand finally dried in an oven at 210° C. for 1 hour and fifteen minutes.

The polymerization exotherm was measured at 49° C. 30 minutes after the slurry was transferred to the preheated mold. The mold was then cooled to room temperature, opened and a smooth glossy solid polymer composition removed and cut with a diamond saw to obtain samples for evaluation (Table II).

*Example 8*

A comparsion of the products prepared in Example 6 and in Example 7 is made in Table III. It can be seen that the product of Example 6, which does not contain a coupling agent, does not have the surprising properties of flexural strength possessed by the product of Example 7. The reinforced composition prepared in Example 7 exhibits more than 210% increase in flexural strength over the product of Example 6 prepared without the coupling agent. Flexural modulus was also increased. The flexural strength and modulus were determined by ASTM D-790.

TABLE II

| Product of— | Flexural Strength (p.s.i.) | Flexural Modulus (p.s.i.) |
|---|---|---|
| Example 6 | 6,700 | 1.68×10⁶ |
| Example 7 | 14,400 | 1.87×10⁶ |

*Example 9*

A series of examples are provided (Examples 9 to 10) to demonstrate the changes in physical properties of reinforced polymer that are made by the influence of the methods used to couple the particulate mineral to the polymer.

In this run a glass reactor was charged with 350 g. methyl methacrylate, 4.0 g. trimethylolpropane trimethacrylate and 700 g. wollastonite that had been treated with 3-trimethoxysilylpropyl methacrylate in methanol solution (5.0 g. of the coupling agent per 2000 g. of wollastonite). The mineral-coupling agent had been dried in an oven at 210° C. for 75 minutes, cooled and ground in a ball mill prior to use. These reactants were thoroughly stirred in the reactor and 8.75 ml. cumene hydroperoxide added followed by the addition of 24.5 ml. triethylborane/pyridine complex in the ethylene oxide-nonylphenol condensate as described in Example 6. Thorough mixing was continued for 30 seconds and the reaction mixture then poured into a simple polished plate mold at 40° C. The plates of the mold were separated 1/4" by the use of rubber gaskets.

After 13 minutes polymerization time within the mold, the maximum reaction exotherm occurred, reaching 55° C. The mold was immediately cooled and the sample removed from the plates. The solid polymeric sheet was cut into two pieces. One piece was further divided to obtain samples for physical testing and the other piece was post cured for 17 hours in an oven at 90° C. Evaluation data is reported in Table III.

*Example 10*

The weight of reactants used in this run is generally equivalent to the weight used in Example 11 but the general procedure was modified. A glass reactor was charged with 350 g. methyl methacrylate and 8.4 g. trimethylolpropane trimethacrylate. The wollastonite used in this preparation had been ground in a ball mill and dried in an oven at 90° C. for 16 hours and then cooled. The wollastonite, 700 g. was added in portions to the reactor along with 3.75 ml. cumene hydroperoxide and 1.68 ml. 3-trimethoxysilylpropyl methacrylate. The reactants were thoroughly agitated in an atmosphere of nitrogen and then 24.5 ml. of the triethylborane/pyridine catalyst was added, as used in Example 9. The materials were thoroughly mixed for 30 seconds and then poured into a plate mold preheated to 40° C. The maximum reaction temperature reached 82° C. 17 minutes after the material was transferred to the mold. The mold was cooled, the solid glossy product was removed from the mold and cut into 2 pieces, 1 of which was subjected to a post cure in an oven at 90° C. for 17 hours. Thereafter samples were cut from both sections for evaluation for physical properties (Table III).

*Example 11*

In this run the reactor was charged with 350 g. methyl methacrylate, 8.4 g. trimethylolpropane trimethacrylate, 1.68 ml. 3-trimethoxysilylpropyl methacrylate and 700 g. wollastonite that had been ground in a ball mill. These reactants were thoroughly mixed and then heated to 100° C. under refluxing conditions. A vacuum was gradually applied to the reactor to slowly distill off 15 ml. of liquid. The reactants were then cooled to room temperature and an addition of 15 ml. methyl methacrylate made. The reactants were stirred in an atmosphere of nitrogen as 8.75 ml. cumene hydroperoxide was added followed by 24.5 ml. triethylborane/pyridine catalyst as previously described. The mixture was stirred for an additional 30 seconds and then rapidly poured into a plate mold previously heated to 40° C. The peak reaction exotherm occurred 17 minutes after transfer of the material to the mold and was noted at 84° C. The mold was then cooled to room temperature and the composition removed and divided into two equal sections. One section was post cured for 17 hours at 90° C in an oven and then cooled. Thereafter, both sections were cut to prepare samples for physical property evaluation (Table III). This example also demonstrates the feasibility of in situ reaction of coupler and inorganic.

*Example 12*

Physical properties of the product described in Examples 9 to 11 are summarized in the following Table III. It can be seen that a post curing step improves the physical property of each of the samples evaluated.

TABLE III

| | Post Cure | Flexural Strength (p.s.i.) | Corrected Impact Strength (ft. lb./in. notch) |
|---|---|---|---|
| Example 9 | No | 15,500 | 0.25 |
| | Yes | 16,000 | 0.29 |
| Example 10 | No | 9,800 | 0.31 |
| | Yes | 10,600 | 0.32 |
| Example 11 | No | 16,300 | 0.31 |
| | Yes | 17,000 | 0.31 |

The foregoing data indicate that hydrolyzing conditions are required to obtain a chemical bond between the mineral and the coupling agent. Thus in Example 9 and Example 11 water was present, absorbed on the wollastonite, and occurred in a sufficient quantity to hydrolyze the coupling agent. On the other hand, in Example 10 the water was driven off the surface of the mineral and hydrolysis of the coupling agent was prevented. Thus there was not a good chemical bond between the wollastonite and the coupling agent so that the properties of the finished composition were not nearly as good as those obtained by the procedures of Example 9 and Example 11.

*Example 13*

A series of reinforced polymeric compositions (Examples 13 to 16) was prepared to demonstrate the effectiveness of methacrylate copolymers in the polymeric systems. In the instant run the glass reactor was charged with 332.5 g. methyl methacrylate, 17.5 g. lauryl methacrylate, 7.0 g. benzoyl peroxide, and 600.9 g. wollastonite that had been pretreated with 3-trimethoxysilylpropyl methacrylate as described in Example 2 (a calculated volume fraction of 0.35). The reactants were thoroughly mixed at room temperature and stirred at a vacuum of 95 mm. Hg for 5 minutes before pouring the reaction mixture into a simple plate mold having a free space of ¼", said mold being preheated to 65° and mounted in a tilted position on a vibrating table. The composition was maintained at 65° for 20 hours and the mold then cooled to room temperature and opened to remove a ¼" thick sheet of glossy hard polymeric product. Samples of this product were taken for evaluation of physical properties.

*Example 14*

The general procedure of Example 13 was followed in preparing a reinforced copolymer of 90% of methyl methacrylate and 10% lauryl methacrylate. A charge to the reactor consisted of 315.0 g. methyl methacrylate, 35.0 g. lauryl methacrylate, 7.0 benzoyl peroxide, and 601.8 g. coupler-treated wollastonite wherein the coupler was 3-trimethoxysilylpropyl methacrylate. The treated particulate mineral was identical to that used in Example 13 and was added in a quantity calculated to give a volume fraction of 0.35. The reactants were polymerized at 65° C. for 20 hours in a simple plate type mold to produce a solid glossy product of ¼" thickness which was cut into specimens for physical property determination.

*Example 15*

In this run the charge to a glass reaction vessel consisted of 332.5 g. methyl methacrylate, 17.5 g. butyl methacrylate, 7.0 g. benzoyl peroxide, and 600.1 g. coupler-treated wollastonite prepared according to the procedure of Example 13. Polymerization procedure was identical to that described in Example 13 and the glossy ¼" sample was produced after polymerization at 65° C. for 20 hours. Samples of the product were cut for evaluation of physical properties.

*Example 16*

The initial charge to the reactor consisted of 315.0 g. methyl methacrylate, 35.0 g. butyl methacrylate, 7.0 g. benzoyl peroxide, and 601.5 g. coupler-treated wollastonite prepared according to the procedure of Example 13 to give a volume fraction of 0.35. This slurry was thoroughly mixed under a 75 mm. Hg vacuum for 5 minutes and poured into ¼" spaced mold for polymerization for 20 hours at 65° C. At the end of this time the mold was cooled to room temperature, opened and the sample removed and cut into individual pieces for physical property evaluation as reported in Example 17.

*Example 17*

A summary of the physical properties of the products prepared in Examples 13 to 16 is included in Table IV. In each of the four examples the volume fraction of coupler-treated wollastonite was adjusted to be 0.35, and each of the polymerization was conducted under similar conditions.

TABLE IV

| Product of — | Flexural Strength (p.s.i.) | Flexural Modulus (p.s.i.) | Impact Strength, C/A (ft. lb./in. notch) |
|---|---|---|---|
| Example 13 | 15,600 | $1.80 \times 10^6$ | 0.11/0.33 |
| Example 14 | 16,800 | $1.76 \times 10^6$ | 0.11/0.31 |
| Example 15 | 16,000 | $1.65 \times 10^6$ | 0.13/0.34 |
| Example 16 | 16,800 | $2.09 \times 10^6$ | 0.12/0.32 |

While the invention has been described with particular reference to preferred embodiments thereof, it will be appreciated that variations from the details given herein can be effected without departing from my invention in its broadest aspects.

What is claimed is:

1. A reinforced polymer composition comprising an alkyl methacrylate polymer, wherein the alkyl group has up to 4 carbon atoms, from about 25 to about 90% by weight of an inorganic filler material, with a water solubility less than 0.15 gram per liter and from about 0.1 to about 2% based on the weight of said filler material of a coupling agent of the formula

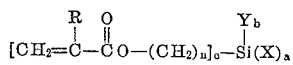

where R is selected from the group consisting of hydrogen and alkyl, X is a hydrolyzable radical, Y is an alkyl radical, $n$ is an integer from 1 to 6, $a$ is an integer from 1 to 3, $b$ is an integer from 0 to 2, $c$ is an integer from 1 to 3, and the sum of $a+b+c$ equals 4, wherein said polymer is bound to said inorganic material through said coupling agent.

2. A reinforced polymeric composition according to claim 1 wherein said coupling agent is 3-trialkoxysilylpropyl methacrylate.

3. A reinforced polymeric composition according to claim 1 wherein said alkyl methacrylate polymer is polymethyl methacrylate.

4. A reinforced polymeric composition according to claim 1 wherein said alkyl methacrylate polymer is a copolymer of methyl methacrylate with a monomer selected from the alkyl acrylates and the alkyl methacrylates both of said monomers having alkyl groups with up to 12 carbon atoms.

5. A reinforced polymeric composition according to claim 1 wherein said alkyl methacrylate polymer has a network structure from the copolymerization of methyl methacrylate with a polymethacrylate having up to 4 functional methacrylate groups.

6. A reinforced polymeric composition comprising an
   (a) alkyl methacrylate polymer wherein said alkyl group has up to 4 carbon atoms;
   (b) from about 25 to about 90% by weight of an inorganic siliceous material having a 3-dimensional crystal structure, a somewhat refractory nature with a melting point above about 800° C., a Moh's hardness of at least 4, and a water solubility of less than 0.1 gram per liter; and
   (c) from about 0.1 to about 2% based on the weight of said siliceous material of a coupling agent of the formula

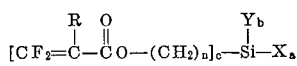

where R is selected from the group consisting of hydrogen and methyl, X is a hydrolyzable radical, Y is an alkyl radical, $n$ is an integer from 1 to about 6, $a$ is an integer from 1 to 3, $b$ is an integer from 0 to 2, $c$ is an integer from 1 to 3, and the sum of $a+b+c$ equals 4, wherein said polymer is bound to said inorganic material through said coupling agent.

7. A reinforced polymeric composition according to claim 6 wherein said inorganic siliceous material is granular.

8. A reinforced polymeric composition according to claim 6 wherein said inorganic siliceous material is acicular.

9. A composition of claim 6 wherein said inorganic material is wollastonite.

10. A composition of claim 6 wherein said inorganic material is silica.

11. A process for preparing reinforced polymeric compositions comprising
    (a) reacting from about 25 to about 90% by weight based on the total reactant mixture of an inorganic filler material with a water solubility less than 0.15 gram per liter with from about 0.1 to about 2% based on the weight of said filler material of a coupling agent of the formula

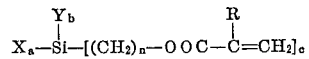

where R is selected from the group consisting of hydrogen and alkyl, X is a hydrolyzable radical, Y is an alkyl radical, $n$ is an integer from 1 to about 6, $a$ is an integer from 1 to 3, $b$ is an integer from 0 to 2, $c$ is an integer from 1 to 3, and the sum of $a+b+c$ equals 4; and
    (b) conducting a polymerization of an alkyl methacrylate wherein said alkyl group has up to 4 carbon atoms in the presence of said inorganic filler material and said coupling agent to prepare an alkyl methacrylate polymer bound to said inorganic filler material through said coupling agent.

12. A process according to claim 11 wherein the reaction product of step (a) is formed in the presence of the monomers to be polymerized.

13. A process according to claim 11 wherein the reaction product of step (a) is formed prior to the addition of the monomer system.

14. A process according to claim 11 wherein said inorganic filler material is a siliceous material having a 3-dimensional silicate crystal structure, a somewhat refractory nature with a melting point above about 800° C., a Moh's hardness of at least 4, and a water solubility of less than 0.1 gram per liter.

15. A process according to claim 11 wherein the polymerization is conducted in the presence of a catalyst prepared by the interaction of a free-radical producing peroxygen compound with a complexed trialkylborane, wherein each alkyl group contains from 1 to 14 carbon atoms.

16. A process according to claim 11 wherein the alkyl methacrylate polymer has been prepared by the polymerization of a monomer system containing a major proportion of methyl methacrylate.

References Cited

UNITED STATES PATENTS

| | | | |
|---|---|---|---|
| 2,742,378 | 4/1956 | Te Grotenhuis | 260—827 |
| 2,952,595 | 9/1960 | Jordan et al. | 260—41 |
| 3,079,361 | 2/1963 | Plueddemann | 260—41 |

FOREIGN PATENTS

| | | |
|---|---|---|
| 686,760 | 5/1964 | Canada. |

MORRIS LIEBMAN, *Primary Examiner.*

L. T. JACOBS, *Assistant Examiner.*

UNITED STATES PATENT OFFICE

CERTIFICATE OF CORRECTION

Patent No. 3,324,074            June 6, 1967

Robert J. McManimie

It is certified that error appears in the above identified patent and that said Letters Patent are hereby corrected as shown below:

Column 5, line 64, "50%" should read -- 90% --. Column 7, lines 44 to 47, $$\text{"}-\overset{|}{\underset{|}{S_3}}-OH\text{"} \quad \text{should read} \quad --\overset{|}{\underset{|}{S_i}}-OH --.$$

Signed and sealed this 10th day of March 1970.

(SEAL)
Attest:

Edward M. Fletcher, Jr.           WILLIAM E. SCHUYLER, JR.

Attesting Officer                Commissioner of Patents